(12) United States Patent
Raynor et al.

(10) Patent No.: US 8,462,114 B2
(45) Date of Patent: Jun. 11, 2013

(54) COMPUTER NAVIGATION DEVICES

(75) Inventors: Jeffrey Raynor, Edinburgh (GB); Pascal Mellot, Lans en Vercors (FR)

(73) Assignees: STMicroelectronics Ltd., Marlow-Buckinghamshire (GB); STMicroelectronics SA, Crolles (FR)

( * ) Notice: Subject to any disclaimer, the term of this patent is extended or adjusted under 35 U.S.C. 154(b) by 2424 days.

(21) Appl. No.: 11/171,125

(22) Filed: Jun. 30, 2005

(65) Prior Publication Data

US 2006/0007155 A1    Jan. 12, 2006

(30) Foreign Application Priority Data

Jul. 7, 2004    (EP) .................................... 04254079

(51) Int. Cl.
*G06F 3/033*    (2006.01)
*G09G 5/08*    (2006.01)

(52) U.S. Cl.
USPC .......................................................... 345/166

(58) Field of Classification Search
USPC ................... 345/166, 156–165, 167; 382/107
See application file for complete search history.

(56) References Cited

U.S. PATENT DOCUMENTS

| | | | |
|---|---|---|---|
| 6,664,948 B2 * | 12/2003 | Crane et al. | 345/166 |
| 7,161,582 B2 * | 1/2007 | Bathiche et al. | 345/156 |
| 7,221,356 B2 * | 5/2007 | Oliver et al. | 345/166 |
| 7,324,086 B2 * | 1/2008 | Kong | 345/157 |
| 2003/0034959 A1 | 2/2003 | Davis et al. | 345/166 |
| 2005/0035947 A1 * | 2/2005 | Lutian | 345/166 |
| 2005/0190157 A1 * | 9/2005 | Oliver et al. | 345/166 |

* cited by examiner

*Primary Examiner* — Michael Pervan
(74) *Attorney, Agent, or Firm* — Allen, Dyer, Doppelt, Milbrath & Gilchrist, P.A.

(57) ABSTRACT

An optical mouse includes an image sensor for providing image data via an analog-to-digital converter to a correlation circuit and a motion estimation circuit to provide output signals representative of motion of the mouse. The output signals may be disabled when the mouse is lifted away from the working surface. This may be achieved by high-pass filtering the signals, summing each frame in a summer to provide a single value, and comparing this to a threshold. If the filtered and summed value exceeds the threshold, this may indicate that the image contains in-focus objects, and that the mouse is on the working surface.

12 Claims, 1 Drawing Sheet

COMPUTER NAVIGATION DEVICES

FIELD OF THE INVENTION

The present invention relates to computer navigation devices or computer mouses, and in particular, to an integrated circuit for use in such devices.

BACKGROUND OF THE INVENTION

Roller-ball type computer mouses suffer from problems arising from the use of mechanical components. Optical computer mouses are readily available and overcome some of these problems. However, an optical computer mouse may suffer from other problems which hinder their acceptability.

One of these problems is the inability of currently available optical mouses to deal with the common use of lifting the mouse when there are space limitations. During movement of the mouse, it is common for a user to lift the mouse from the surface to move the cursor on the computer screen.

For example, if movement of the mouse is limited to 20 cm and this motion will move the cursor half-way across the computer screen, and if the user has already has moved the mouse to the right-most available position (i.e., limited by the mouse pad or by the space available on the desk), then the user will lift the mouse and move it to the left-most position possible. Afterwards, the mouse is replaced, and then moved again to the right so that the cursor will move the entire width of the screen.

This technique works for mechanical mouses since the ball does not rotate during lift-off and repositioning of the mouse. However, an optical mouse may see features during this procedure, leading to undesired cursor movement.

This problem has been addressed in U.S. Pat. No. 6,281,882 to Gordon, which discloses the use of a correlation product from the tracking algorithm of the mouse. Although this system will correctly identify lift-off, it will fail if the mouse is moving very quickly since the amount of correlation in the image will also be reduced by the motion.

U.S. Pat. No. 6,433,780 to Gordon discloses using a mechanical switch on the base of the mouse to detect lift-off. Although this will work, it adds to the complexity and cost of the mouse, and the additional mechanical features reduce reliability. The '780 patent also discloses the use of a special switch in which the user can press to suppress cursor movement. This adds an extra burden on the user and is undesirable. Even though the '780 patent mentions that the image will not be focused during lift-off, it does not disclose any method for detecting or using the loss of focus.

SUMMARY OF THE INVENTION

An object of the present invention is to provide an optical navigation device in which the above described problems are eliminated or reduced.

This and other objects, advantages and features in accordance with the present invention are provided by a method for detecting whether an optical mouse is in contact with a working surface, wherein the optical mouse comprises an image sensor focused to image the working surface and provide signals corresponding to the image. The signals may be analyzed to determine whether the image contains in-focus objects, and the mouse motion output may be disabled when no in-focus objects are found. Thus, the invention permits lift-off of the mouse to be detected without the use of electromechanical parts.

The signals are preferably analyzed by summing the output of a whole or a majority of each frame, comparing the summed output with a threshold value, and assessing the frame as containing in-focus objects when the threshold value is exceeded. The image sensor output may be high-pass filtered before being analyzed. The high-pass filtered signal may also be used as input to a correlation circuit which supplies a motion estimation circuit.

Another aspect of the present invention is directed to an optical mouse. The optical mouse comprises an image sensor for forming an image of a working surface on which the mouse is used, and motion signal means or circuit for producing an output signal representing XY motion of the mouse on the working surface by processing the output of the image sensor.

The optical mouse may further comprise lift-off detection means or circuit for detecting the mouse being lifted away from the working surface. The lift-off detection circuit may disable the output signal during lift-off, and may also determine whether the image contains in-focus objects.

The lift-off detection circuit may comprise a summing circuit to sum the output of the whole or a majority of each frame, and a comparison circuit to compare the summed output with a threshold value and to assess the frame as containing in-focus objects when the threshold value is exceeded.

In a preferred embodiment, the mouse may further comprise a high-pass filter between the image sensor and the summing circuit. The motion signal circuit may be connected to receive the output of the high-pass filter. The motion signal circuit may comprise a correlation circuit providing a measure of the correlation of successive image frames, and a motion estimation circuit deriving a motion signal from the correlation.

Another aspect of the present invention is directed to an integrated circuit comprising an image sensor having an array of pixels for reading out pixel values to form a picture signal, and an analog-to-digital converter to convert the picture signal to a digital format. An image processor may perform correlation on successive frames of the picture signal to derive information therefrom.

The lift-off detection circuit may be connected between the analog-to-digital converter and the image processor. The lift-off detection circuit may comprise a summing circuit arranged to sum the output of the whole or a majority of each frame, and a comparison circuit may be arranged to compare the summed output with a threshold value.

Other features and advantages of the invention will be apparent from the claims and from the following description.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
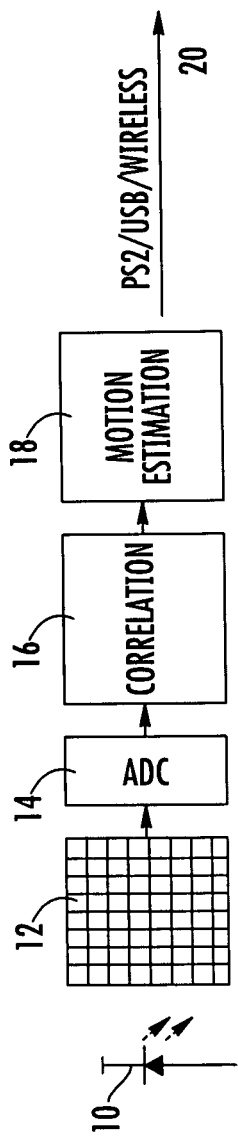
FIG. 1 is a schematic diagram illustrating operation of an optical mouse according to the prior art.

Referring to FIG. 1, in a prior art optical mouse an LED 10 illuminates an area under the mouse which is imaged by a solid state image sensor 12. The output of the image sensor 12 is converted to digital form by an analog-to-digital converter (ADC) 14, and the digital signal is fed to a correlation circuit 16. The correlation circuit 16 produces a measure of correlation between subsequent fields of the image. This is converted by a motion estimation circuit 18 into XY motion signals transmitted by any suitable format, as indicated by reference 20.

Figure 2:
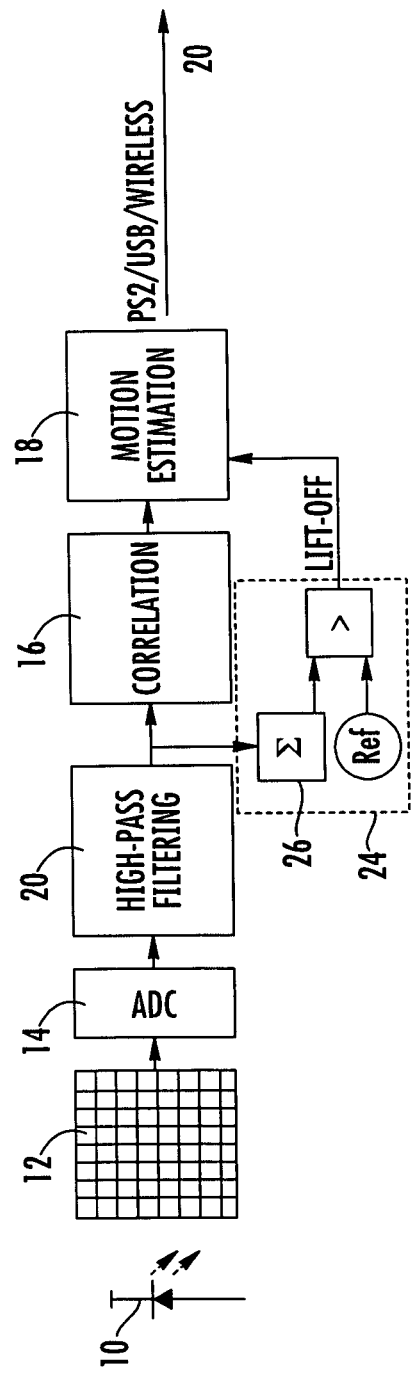
FIG. 2 is a schematic diagram illustrating operation of an optical mouse according to the present invention.

In the embodiment shown in FIG. 2, similar parts are denoted by like references. The output of the ADC 14 is filtered by a high-pass filter 22 before being passed to the correlation circuit 16. The filtering reduces the effect of uneven illumination by the LED 10, and enhances the edges of objects in the field of view. The use of such filtering in processing image signals is the subject of a copending application 11/170,985 filed concurrently herewith and assigned to the assignee of the present invention, the entire disclosure of which is incorporated herein by reference.

The output of the high-pass filter 22 is also passed to a lift-off detection circuit 24, in which a summer 26 sums all (or a large proportion) of each frame of the data. In other words, a whole image is reduced to a single value. This value is then compared against a reference threshold. If it is greater than the threshold then there is useful image present and the correlation data is used. If the summed value is less than or equal to the threshold, then there is not enough detail in the image for it to be useful and the correlation data is not used.

It will be readily appreciated that the circuitry shown in FIG. 2 can be incorporated into a single integrated circuit chip. The image sensor 12 may be a CMOS image sensor, and the other circuits can then be readily formed in the same CMOS chip.

Many methods to high-pass filter an image are known to those skilled in the art. One of the simplest methods uses a 3×3 matrix operation:

| −1 | −1 | −1 |
|---|---|---|
| −1 | 8 | −1 |
| −1 | −1 | −1 |

One useful effect of high-pass filtering of the image is that the DC content (which equates to brightness) of the scene is lost. This is advantageous for lift-off detection since the comparison is not sensitive to image brightness, and thus it is not sensitive to the reflectivity of the surface on which the mouse is being used. This makes the system robust because it will enable the technique to operate over a very wide range of mouse surfaces.

The mouse operates by detecting the presence of sharply focused objects in the field of view. If these are present, then the output of the correlation circuit is used to produce the motion vector. If they are not present, then the output of the correlation circuit is suppressed and no motion is indicated by the mouse.

The preferred embodiment does this without complex analysis of focus. However, other methods of determining the presence of sharply focused objects could be used in the present invention. Various such methods are known, for example in the following patents: U.S. Pat. No. 4,559,446 to Suzuki, U.S. Pat. No. 4,673,276 to Yoshida, and U.S. Pat. No. 4,980,716 to Suzuki. Reference is also directed to "The Image Processing Handbook" (Second Edition), John C. Russ, ISBN 084932516-1, Chapter 5, section "Measuring images in the frequency domain"

The invention thus provides for detecting whether a mouse is on a usable surface or off surface (in the air), which may be independent of the speed of the mouse and which may be straightforward and inexpensive to implement.

That which is claimed is:

1. A method for detecting whether an optical mouse is in contact with a working surface, the optical mouse comprising an image sensor and a motion output, the method comprising:
   imaging the working surface with the image sensor for providing signals corresponding to the image;
   analyzing the signals corresponding to the image for determining whether the image contains no in-focus object by
      summing an output of at least a majority of each frame of the image,
      comparing the summed output of each frame of the image to a threshold, and
      assessing each frame of the image based upon the comparing; and
   disabling the motion output when no in-focus object is found.

2. A method according to claim 1, further comprising high pass filtering the signals before being analyzed.

3. A method according to claim 2, wherein the optical mouse further comprises a correlation circuit and a motion estimation circuit connected thereto; and further comprising applying filtered signals to the correlation circuit for correlating successive frames of the image, with the correlating providing an input to the motion estimation circuit.

4. An optical mouse comprising:
   an image sensor for forming an image of a working surface on which the optical mouse is used;
   a motion signal circuit for processing the image from said image sensor for providing an output signal representing motion of the optical mouse on the working surface; and
   a lift-off detection circuit connected to said image sensor and to said motion signal circuit for
      detecting the optical mouse being lifted away from the working surface,
      determining whether the image contains no in-focus object, and
      disabling the output signal during lift-off based upon the determining;
   said lift-off detection circuit comprising a summer for summing an output of at least a majority of each frame of the image, and a comparator for comparing the summed output of each frame of the image with a threshold, and for assessing each frame based upon the comparing.

5. An optical mouse according to claim 4, further comprising a high-pass filter between said image sensor and said summer.

6. An optical mouse according to claim 5, wherein said motion signal circuit is connected to an output of said high-pass filter.

7. An optical mouse according to claim 6, wherein said motion signal circuit comprises:
   a correlation circuit for measuring correlation of successive image frames; and
   a motion estimation circuit deriving a motion signal from the correlation.

8. An integrated circuit comprising:
   an image sensor comprising an array of pixels for forming a picture signal of a working surface based upon pixel values;
   an analog-to-digital converter for converting the picture signal to a digital format;
   an image processor for correlating successive frames of the picture signal; and
   a lift-off detector connected between said analog-to-digital converter and said image processor and comprising a summer for summing an output of at least a majority of each frame of the picture signal, and a comparison circuit for comparing the summed output of each frame of the picture signal with a threshold.

9. An integrated circuit according to claim 8, wherein said image sensor, said analog-to-digital converter, said image processor and said lift-off detector are formed using CMOS technology.

10. An integrated circuit according to claim 8, further comprising a high-pass filter between said image sensor and said summer.

11. An integrated circuit according to claim 10, wherein said image processor is connected to an output of said high-pass filter.

12. An integrated circuit according to claim 8, wherein said image processor comprises:

a correlation circuit for measuring correlation of successive image frames of the picture signal; and a motion estimation circuit for providing a motion signal based upon measured correlation of the successive image frames of the picture signal.

\* \* \* \* \*